United States Patent
Ishii et al.

(10) Patent No.: US 6,707,416 B2
(45) Date of Patent: Mar. 16, 2004

(54) RADAR SYSTEM

(75) Inventors: Toru Ishii, Hirakata (JP); Tetsu Nishimura, Nagaokakyo (JP); Motoi Nakanishi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/359,720

(22) Filed: Feb. 7, 2003

(65) Prior Publication Data
US 2003/0156054 A1 Aug. 21, 2003

(30) Foreign Application Priority Data
Feb. 19, 2002 (JP) ........................................ 2002-041660

(51) Int. Cl.$^7$ ................................................. G01S 7/28
(52) U.S. Cl. ............................. 342/70; 342/71; 342/72; 342/175; 342/192; 342/195
(58) Field of Search .............................. 342/70, 71, 72, 342/58, 175, 192, 195

(56) References Cited

U.S. PATENT DOCUMENTS

| | | | |
|---|---|---|---|
| 4,432,019 A | * | 2/1984 | Maier .................... 358/426.14 |
| 6,647,445 B2 | * | 11/2003 | Rzyski ........................ 710/62 |
| 2003/0156054 A1 | * | 8/2003 | Ishii et al. .................... 342/70 |

FOREIGN PATENT DOCUMENTS

| | | |
|---|---|---|
| JP | 3-251781 | 11/1991 |
| JP | 3-295485 | 12/1991 |
| JP | 7-35844 | 2/1995 |
| JP | 9-133765 | 5/1997 |

OTHER PUBLICATIONS

"A pulse compression processor implementation with DSP for airborne pulse Doppler radar", Xinggan Zhang; Zhaoda Zhu; Digital Avionics Systems Conference, 1994. 13th DASC., AIAA/IEEE, Oct. 30–Nov. 3, 1994 Page(s): 421–425.*

* cited by examiner

Primary Examiner—John B. Sotomayor
(74) Attorney, Agent, or Firm—Keating & Bennett, LLP

(57) ABSTRACT

A radar system is capable of transmitting necessary information through a very small amount of data from a radar device to a host device via a bus with a limited bandwidth. A radar sensor generates a beat signal between a transmission signal and a reflected signal from a target. A signal processor determines a spectrum of the beat signal and compresses the data indicating the spectrum. The resultant compressed data is transmitted to the host device via a bus. The host device decompresses the received data thereby reproducing the spectrum data. The host device then detects the target on the basis of the reproduced spectrum data.

19 Claims, 16 Drawing Sheets

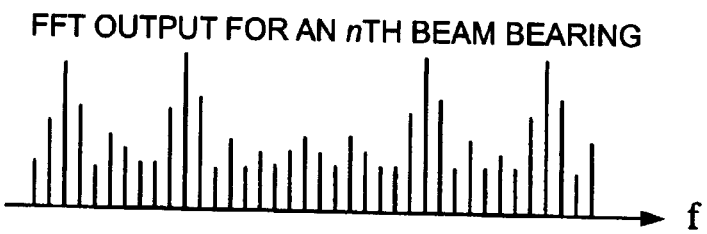
FIG. 6A FFT OUTPUT FOR AN $n$TH BEAM BEARING
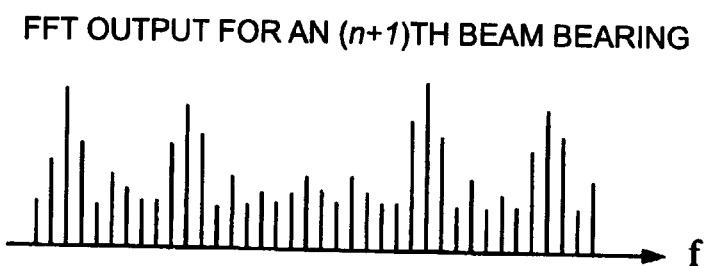
FIG. 6B FFT OUTPUT FOR AN $(n+1)$TH BEAM BEARING
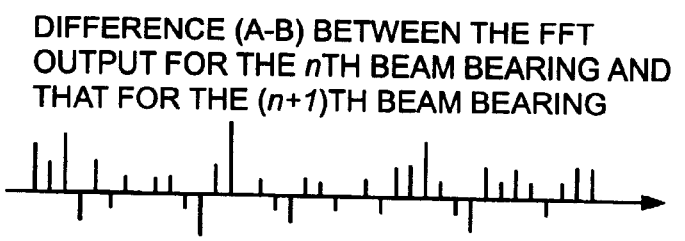
FIG. 6C DIFFERENCE (A-B) BETWEEN THE FFT OUTPUT FOR THE $n$TH BEAM BEARING AND THAT FOR THE $(n+1)$TH BEAM BEARING DIFFERENCE (A-B) BETWEEN THE FFT OUTPUT FOR THE nTH BEAM BEARING AND THAT FOR THE (n+1)TH BEAM BEARING FFT OUTPUT (A(j)) FOR AN nTH BEAM BEARING DIFFERENCE (A(j+1)-A(j)) IN FFT OUTPUT DIFFERENCE (A(j+1)-A(j)) IN FFT OUTPUT

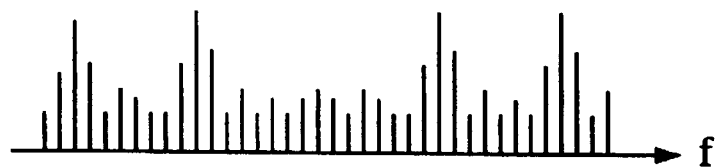
FIG.11A  FFT OUTPUT (Aprev) FOR AN $n$TH BEAM BEARING IN AN $M$TH FRAME
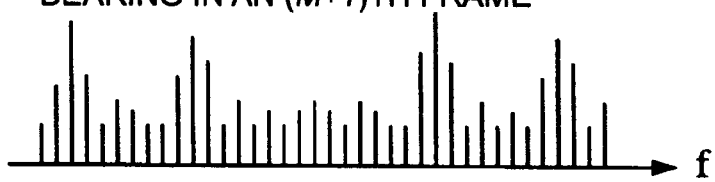
FIG.11B  FFT OUTPUT (Anew) FOR THE $n$TH BEAM BEARING IN AN $(M+1)$TH FRAME
FIG.11C  DIFFERENCE (Aprev-Anow) IN FFT OUTPUT BETWEEN THE $M$TH FRAME AND THE $(M+1)$TH FRAME DIFFERENCE (Aprev-Anow) IN FFT OUTPUT BETWEEN THE $M$TH FRAME AND THE $(M+1)$TH FRAME

RADAR SYSTEM

BACKGROUND OF THE INVENTION

1. Field of the Invention

The present invention relates to a radar system including a radar device for transmitting and receiving a radio wave to and from a target to be detected.

2. Description of the Related Art

In recent years, a standard for a bus, such as CAN (Control Area Network), for use on a vehicle such as a car, has been proposed, and there is a need for a radar device installed on a vehicle and connected to such a bus. In a case in which various devices, in addition to a radar device, are connected to such a general purpose bus, the relative period of time during which the radar exclusively uses the bus must be as short as possible. For example, because of a limited bandwidth of the bus, it is not possible to directly transmit data acquired by scanning the beam over an entire bearing range via the bus.

To solve this problem with the limited bandwidth of a bus connected to a radar device, techniques of reducing the data size transmitted via the bus are disclosed in the following patent documents: (1) Japanese Unexamined Patent Application Publication No. 9-133765; (2) Japanese Unexamined Patent Application Publication No. 3-251781; (3) Japanese Unexamined Patent Application Publication No. 3-295485; and (4) Japanese Unexamined Patent Application Publication No. 7-35844.

The radar device disclosed in patent document (1) is an FM-CW radar device in which after an analog beat signal is converted into digital form and is passed through a digital filter, the resultant data is partially removed.

In the radar device disclosed in patent document (2), a radar video signal obtained by performing sampling at varying intervals is read at regular intervals thereby compressing the data size of the radar video signal.

In the radar device disclosed in patent document (3), a predetermined pattern is subtracted from an original signal and then resultant data is divided according to threshold values and multiplexed.

In the radar device disclosed in patent document (4), data is divided in accordance with a threshold value that is equal to the mean value of time-varying data plus an offset value, and clutter data having a value that is lower than the threshold value is compressed along the time axis.

However, in the radar device disclosed in patent document (1), high-frequency components of the beat signal are lost. As a result, information associated with targets at distant locations is not obtained. In the radar device disclosed in patent document (2) degradation in resolution occurs in a range (distance range) in which sampling is performed at large intervals. In the radar devices disclosed in (3) and (4), data compression is performed only along the time axis (corresponding to the distance), and thus high compression ratios are not obtained.

SUMMARY OF THE INVENTION

In order to overcome the problems described above, preferred embodiments of the present invention provide a radar system that is capable of transmitting necessary information using a very small amount of data from a radar device to a host device via a bus with a limited bandwidth.

According to a preferred embodiment of the present invention, a radar system includes a radar device and a host device wherein the radar device includes a transmitter for transmitting a frequency-modulated transmission signal and generating a beat signal between a portion of the transmission signal and a signal reflected from a target, a spectrum determining unit for determining a spectrum associated with the signal strength of the beat signal, a data compression unit for compressing the spectrum data by removing redundancy from the spectrum data, and a transmitter for transmitting the compressed data via a transmission line, and the host device includes a receiver for receiving the compressed data via the transmission line, decompressing the compressed data, and processing the decompressed data to detect the target.

The radar device may further include a scanner for scanning a beam of the transmission signal within a predetermined range of bearing angle, and the data compression unit may determine the difference in spectrum of the beat signal between adjacent bearing angles.

The data compression unit may also determine the difference in signal strength between spectral components at adjacent locations on the frequency axis.

The radar device may further include a scanner for scanning the beam of the transmission signal within the predetermined range of bearing angle repeatedly from one frame to another, and the data compression unit may determine the difference in spectrum of the beat signal between different frames at the same beam bearing angle.

The coding is preferably performed after replacing data, whose original signal strength is lower than a first threshold value and whose difference value is lower than a second threshold value, with a specific value such as zero.

In addition, the radar device may further include a determining unit for determining detection data associated with a target on the basis of the spectrum, and a transmitter for selectively transmitting either the detection data or the compressed data to the host device via the transmission line.

Data compression is preferably performed by removing redundancy from the spectrum data, and the resultant compressed data is transmitted to the host device via a transmission line such as a bus line. This makes it possible to transmit data necessary to detect a target to the host device via a transmission line with a narrow bandwidth without losing information.

Furthermore, the difference in spectrum of the beat signal between adjacent bearing angles is preferably determined, or the difference in spectrum of the beat signal between adjacent locations on the frequency axis is preferably determined. In the above-described process of determining the difference, it is necessary to temporarily store only spectrum data at one beam bearing angle at a time. Thus, a high capacity of memory is not necessary in the data compression process. This allows a reduction in cost of the radar system. Furthermore, no reduction in frequency resolution occurs.

The difference in spectrum between frames which are adjacent to each other in the time axis is preferably determined, wherein the frame is a unit of data obtained by scanning the beam once over the scanning range. This makes it possible to compress, in a highly efficient fashion, data associated with a target in the same beam bearing angle along the time axis.

Data is preferably compressed after removing random noise components from the spectrum of the beat signal, thereby ensuring that a target can be detected in a highly reliable fashion without being affected by the noise components and without losing information.

Furthermore, random noise is preferably removed by replacing data, whose original signal strength is lower than a first threshold value and whose difference value is lower than a second threshold value, with a specific value such as zero, thereby ensuring that a target can be detected in a highly reliable fashion without losing information associated with signal components originating from the reflected wave from the target.

Furthermore, depending on conditions, the process of detecting a target is also preferably performed by the radar device, and either the resultant detection data or compressed data is selectively transmitted to the host device. This makes it possible to transmit data in a proper form depending on the bandwidth of the transmission line or the processing capability of the host device.

Other features, elements, characteristics and advantages of the present invention will become more apparent from the following detailed description of preferred embodiments with reference to the attached drawings.

BRIEF DESCRIPTION OF THE DRAWINGS

FIGS. 6A and 6B are diagrams showing examples of FFT outputs for adjacent beam bearings, and FIG. 6C is a diagram showing the difference between the FFT outputs shown in FIGS. 6A and 6B;

FIGS. 11A and 11B are diagrams showing examples of FFT outputs of adjacent frames, and FIG. 11C is a diagram showing the difference in FFT output between the adjacent frames;

DESCRIPTION OF THE PREFERRED EMBODIMENTS

The configuration of a radar system according to a preferred embodiment of the present invention is described below with reference to the accompanying drawings.

Figure 1:
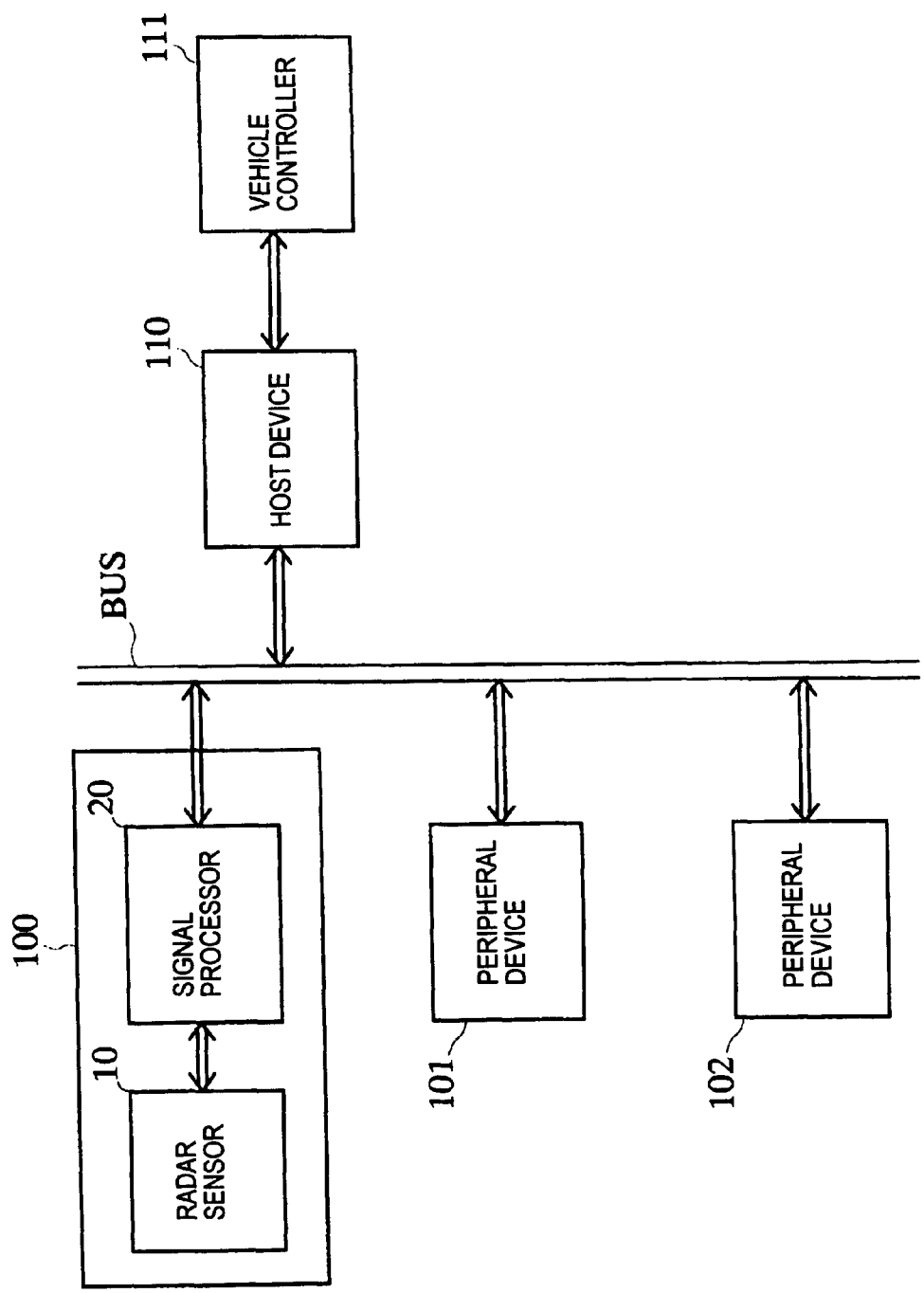
FIG. 1 is a block diagram showing a general configuration of a radar system.

FIG. 1 is a block diagram showing a general structure of a radar system. In FIG. 1, reference numeral 100 denotes a radar device including a radar sensor 10 and a signal processor 20. BUS denotes a bus line such as a CAN (Control Area Network) or a DeviceNet network. The radar device 100 and other peripheral devices 101 and 102 are connected to a host device 110 via the bus line BUS. The host device 110 transmits and receives data to and from the peripheral devices including the radar device 100 via the bus line BUS, and the host device 110 controls a vehicle controller 111 in accordance with the data thereby controlling a vehicle.

Figure 2:
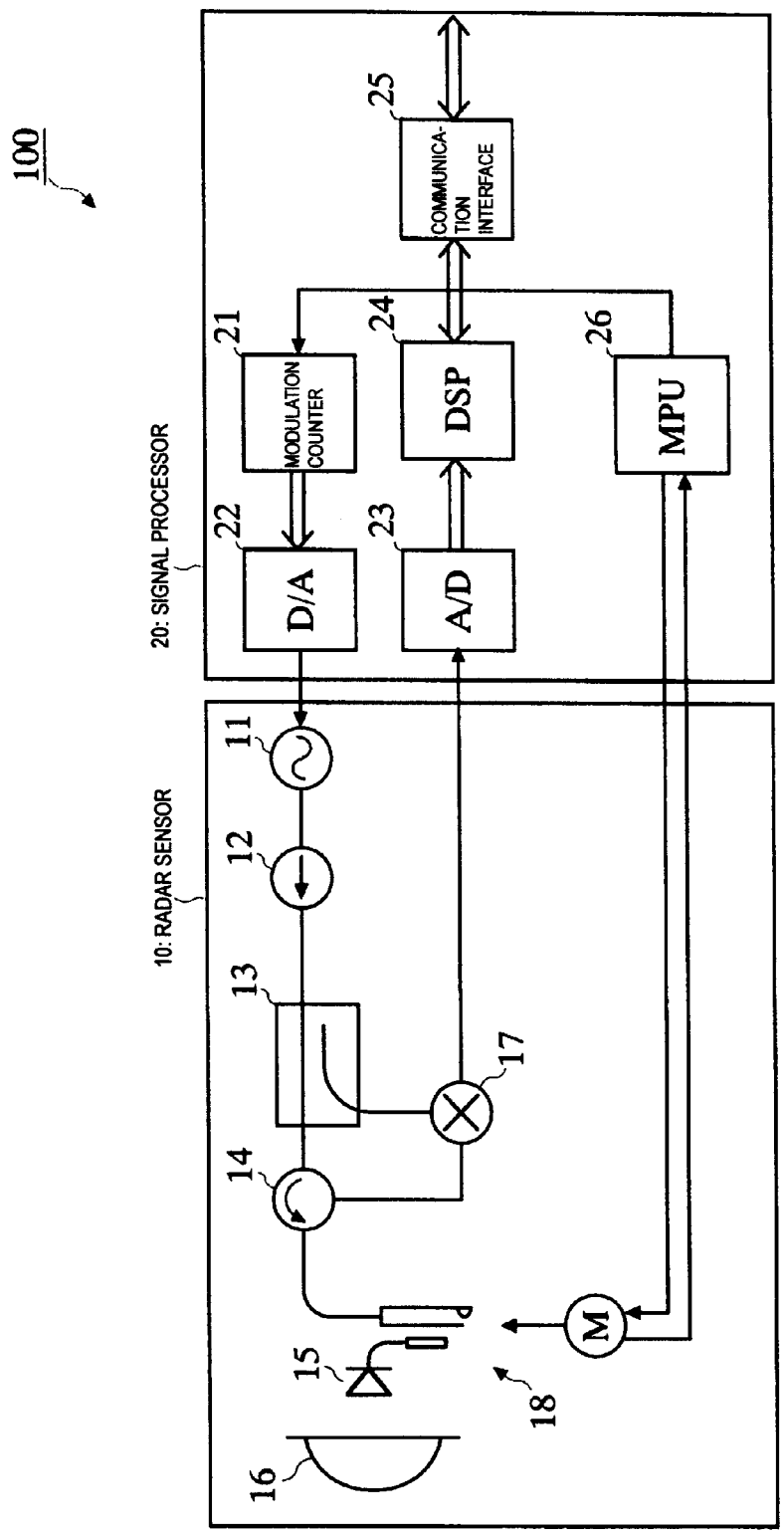
FIG. 2 is a block diagram showing a configuration of a radar device.

FIG. 2 is a block diagram showing the structure of the radar device 100 shown in FIG. 1. In FIG. 2, reference numeral 10 denotes the radar sensor and 20 denotes the signal processor. The radar sensor 10 transmits and receives radar detection radio waves and generates a beat signal between transmitted and received radio waves. The resultant beat signal is output to the signal processor 20. A modulation counter 21 in the signal processing block 20 converts a count value into a triangular-shaped signal under the control of a microprocessor 26. A digital-to-analog converter 22 converts the value output from the modulation counter 21 into an analog signal and outputs the resultant analog signal to a VCO 11 in the radar sensor 10. In accordance with the received analog signal, the VCO 11 performs frequency modulation on the oscillation signal so that the frequency of the oscillation signal changes triangularly, that is, increases in up-modulating intervals and decreases in down-modulating intervals.

The oscillation signal output from the VCO 11 is supplied to a primary radiator 15 via an isolator 12, a coupler 13, and a circulator 14. The primary radiator 15 is located at or almost in the focal plane of a dielectric lens 16. A millimeter wave signal radiated from the primary radiator 15 is focused into a narrow beam via the dielectric lens 16 and transmitted therefrom. If a reflected radio wave from a target such as a car is received by the primary radiator 15 via the dielectric lens 16, the received signal is transferred to a mixer 17 via the circulator 14. In addition to this received signal, a portion of the transmission signal is also applied, as a local signal, to the mixer 17 via the coupler 13. A beat signal having a frequency that is substantially equal to the difference between the frequency of the received signal and the frequency of the local signal is output as an intermediate-frequency signal from the mixer 17 and applied to an analog-to-digital converter 23 in the signal processor 20.

The analog-to-digital converter 23 converts the received intermediate-frequency signal into digital data. A DSP (Digital Signal Processor) 24 determines a power spectrum of the beat signal by performing an FFT (Fast Fourier Transform) on a sequence of data received from the analog-to-digital converter 23. A peak, arising from reflection from a target, in the power spectrum is then detected, for both the up-modulating interval and the down-modulating interval. The relative position and the relative speed of the target are then determined from the pair of peak frequencies of the peaks detected in the up-modulating interval and the down-modulating interval, respectively. The detected information is transmitted to the host device via a communication interface 25.

The radar sensor 10 includes a scan unit 18 for moving the primary radiator 15 in a focal plane of the dielectric lens 16 or in a plane parallel to the focal plane of the dielectric lens 16. The moving part and the fixed part of the primary radiator 15 define a 0-dB coupler. The primary radiator 15 is moved by a driving motor M under the control of the microprocessor 26 thereby scanning the beam.

Figure 3:
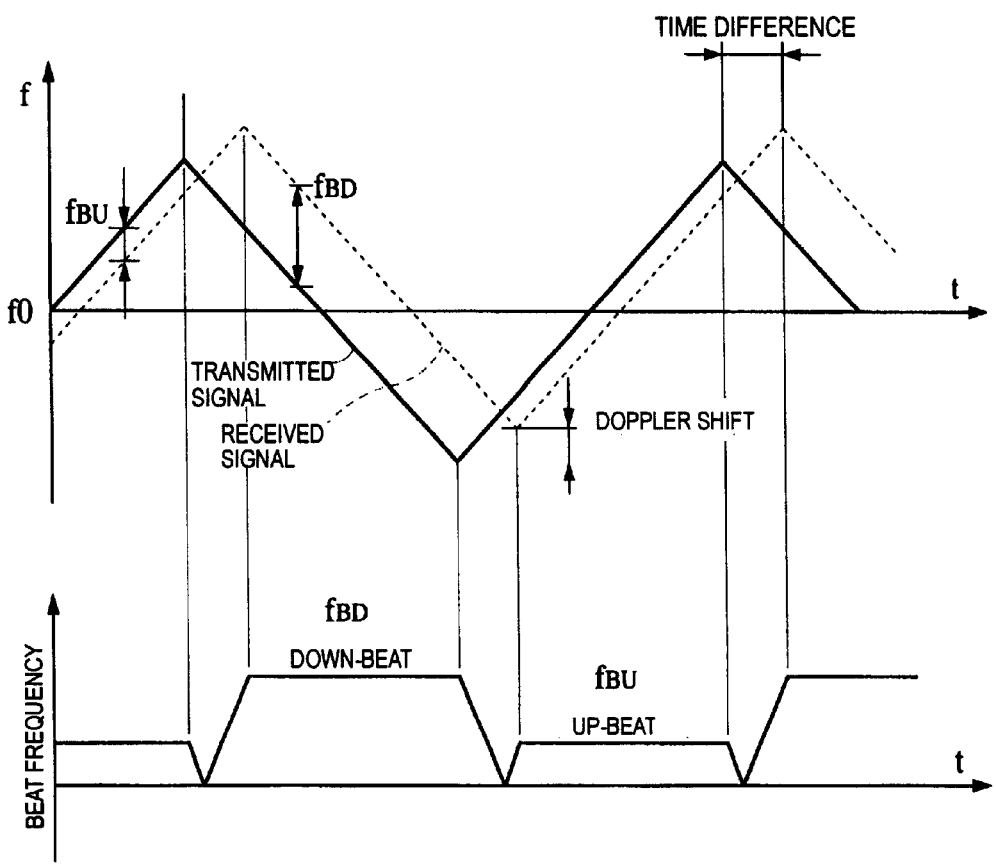
FIG. 3 shows an example of a set of a transmitted signal and a corresponding received signal having a frequency that varies depending on the relative distance and the relative speed of a target.

FIG. 3 shows an example of a shift, which occurs depending on the distance to a target and its relative speed, of a frequency change between the transmitted signal and the received signal. Herein, the frequency difference between the transmitted signal and the received signal in an up-modulating interval of the transmitted signal is referred to as an upbeat frequency $f_{BU}$, and the frequency difference between the transmitted signal and the received signal in a down-modulating interval of the transmitted signal is referred to as a downbeat frequency $f_{BD}$. The shift (time difference) along the time axis between the transmitted triangular-shaped signal and the received triangular-shaped signal corresponds to the round-trip time of the radio wave from the antenna and the target. The shift in frequency between the transmitted signal and the received signal is caused by the Doppler shift depending on the relative speed of the target with respect to the antennal. Because the upbeat frequency $f_{BU}$ and the downbeat frequency $f_{BD}$ correspond to the time difference and the Doppler shift, the distance from the radar to the target and the relative speed of the target with respect to the radar can be determined by detecting the upbeat frequency and the downbeat frequency.

Figure 4:
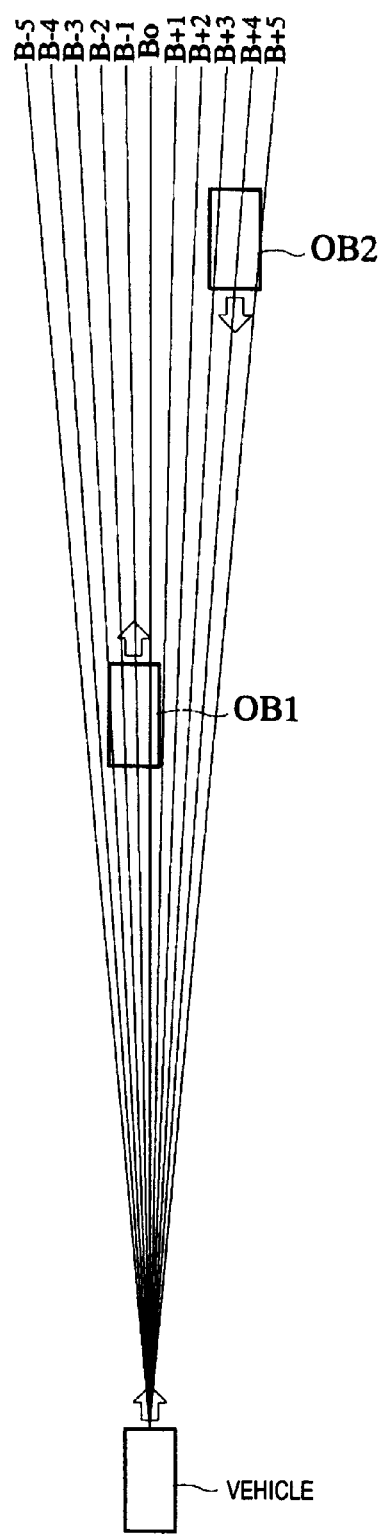
FIG. 4 is a diagram showing a detection range in which a beam is scanned.

FIG. 4 shows an example of the relationship between targets and the bearings of the transmitted and received beams. In this figure, Bo denotes the front direction (perpendicular to the front plane of a vehicle) of the radar installed on a vehicle. B+1, B+2, and so on, denote beam bearings of the beams scanned to the right from the front direction. Similarly, B−1, B−2, and so on, denote beam bearings of the beams scanned to the left from the front direction. Targets OB1, and OB2, denoted by rectangles, represent other vehicles located in front of the vehicle. Arrows indicate the moving directions of the respective targets.

Figure 5:
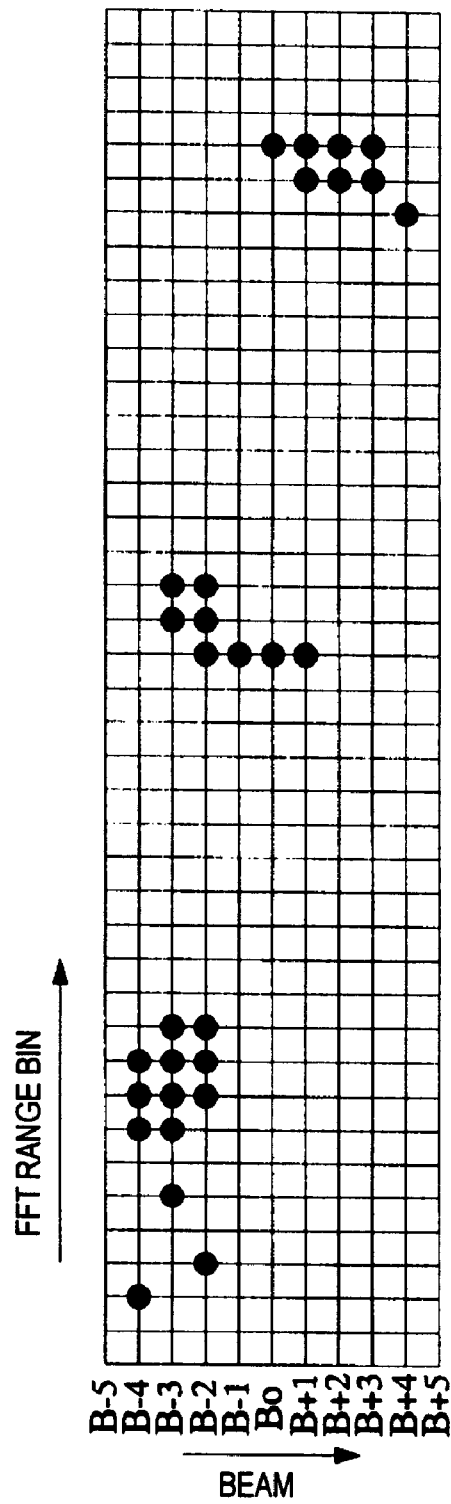
FIG. 5 is a diagram showing an example of spectra for respective beam bearings.

FIG. 5 shows a power spectrum (hereinafter referred to simply as a spectrum) for each beam bearing angle, wherein spectra are represented in a rectangular coordinate system in which the horizontal axis indicates the beam bearing and the vertical axis indicates the frequency. Although the signal strength (power in the present example and also in the following examples) at each frequency has a value represented by a predetermined number of bits, only spectral components with large magnitudes are represented by solid circles in FIG. 5 for the purpose of simplicity. Note that although only the spectrum for each beam bearing determined for one of the up-modulating interval and the down-modulating interval is shown in FIG. 5, the spectrum is determined for both the up-modulating interval and the down-modulating interval.

FIGS. 6A to 6C show spectra of the beams at adjacent bearings of those shown in FIG. 5 and the difference between the spectra. That is, FIGS. 6A and 6B show the spectra for nth and (n+1)th beam bearings, respectively, and FIG. 6C shows the difference between the spectra.

In general, each target has a particular size which is struck by the beam in an interval in which the bearing of the beam is scanned by an amount corresponding to the size of the target, and thus the spectra become similar for beam bearings in that interval. In other words, the spectra of adjacent beam bearings have a high correlation, and thus the difference between the spectra of adjacent beam bearings becomes equal to or nearly equal to zero. The data indicating these differences is compressed via entropy coding such as Huffman coding, for example.

Figure 7A:
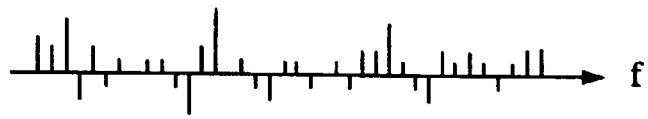
FIGS. 7A to 7C are diagrams showing an example of a process of removing a random noise component.
Figure 7B:
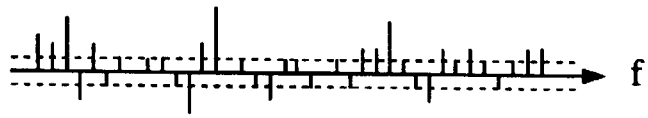
Figure 7C:
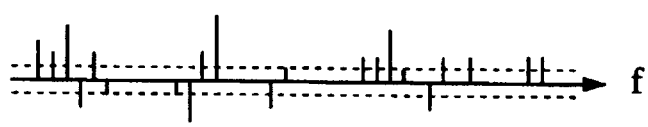

FIGS. 7A to 7C show an example of a manner of further compressing data in the middle of the process, on the basis of the difference values described above. FIG. 7A shows the spectrum difference between nth and (n+1)th beam bearings which are adjacent to each other. In FIG. 7B, broken lines indicate a threshold value (second threshold value) applied to the difference. When the absolute value of the difference is smaller than the threshold value, if the difference is replaced with zero and the result is then subjected to the data compression via entropy coding such as the Huffman coding, the compression ratio is further improved.

When the original data, from which the difference is determined, has a value (power) greater than a threshold value (first threshold value), the replacement with zero is not performed. This makes it possible to remove only noise so that the data includes only useful information.

Figure 8A:
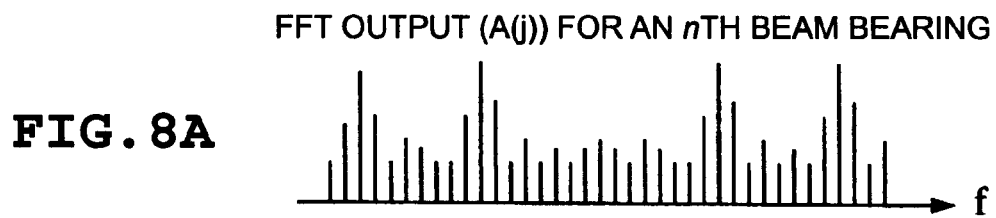
FIGS. 8A and 8B are diagrams showing an example of a process of determining the difference between spectral data which are adjacent to each other in the frequency axis.
Figure 8B:

FIGS. 8A and 8B show an example of a manner of determining the difference between spectral data which are associated with a particular beam bearing angle and which are adjacent to each other in the frequency axis. More specifically, FIG. 8A shows a spectrum at an nth beam bearing angle, and FIG. 8B shows a spectral difference (A(j+1)−A(j)) for respective values of j from 0 to a maximum value, wherein j is the FFT range bin number.

Using the difference between data which are adjacent to each other in the frequency domain allows a reduction in the maximum value. Thus, if the resultant difference data is compressed via entropy coding such as Huffman coding, a high compression ratio is achieved.

Figure 9A:
FIGS. 9A to 9C are diagrams showing an example of a process of removing a random noise component.
Figure 9B:
Figure 9C:
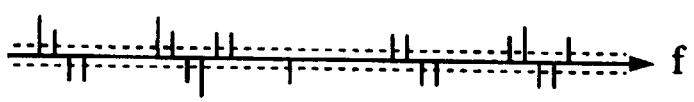

FIGS. 9A to 9C show an example of further compressing data in the middle of the process, on the basis of the difference values described above. More specifically, FIG. 9A shows a difference (A(j+1)−A(j)) between data which are adjacent to each other in the frequency axis. In FIG. 7B, broken lines indicate a threshold value (second threshold value) applied to the difference. When the absolute value of the difference is smaller than the threshold value, if the difference is replaced with zero and if the result is then compressed via entropy coding such as the Huffman coding, the compression ratio is further improved.

When the original data, from which the difference is determined, has a value (power) greater than a threshold value (first threshold value), the replacement with zero is not performed.

Figure 10:
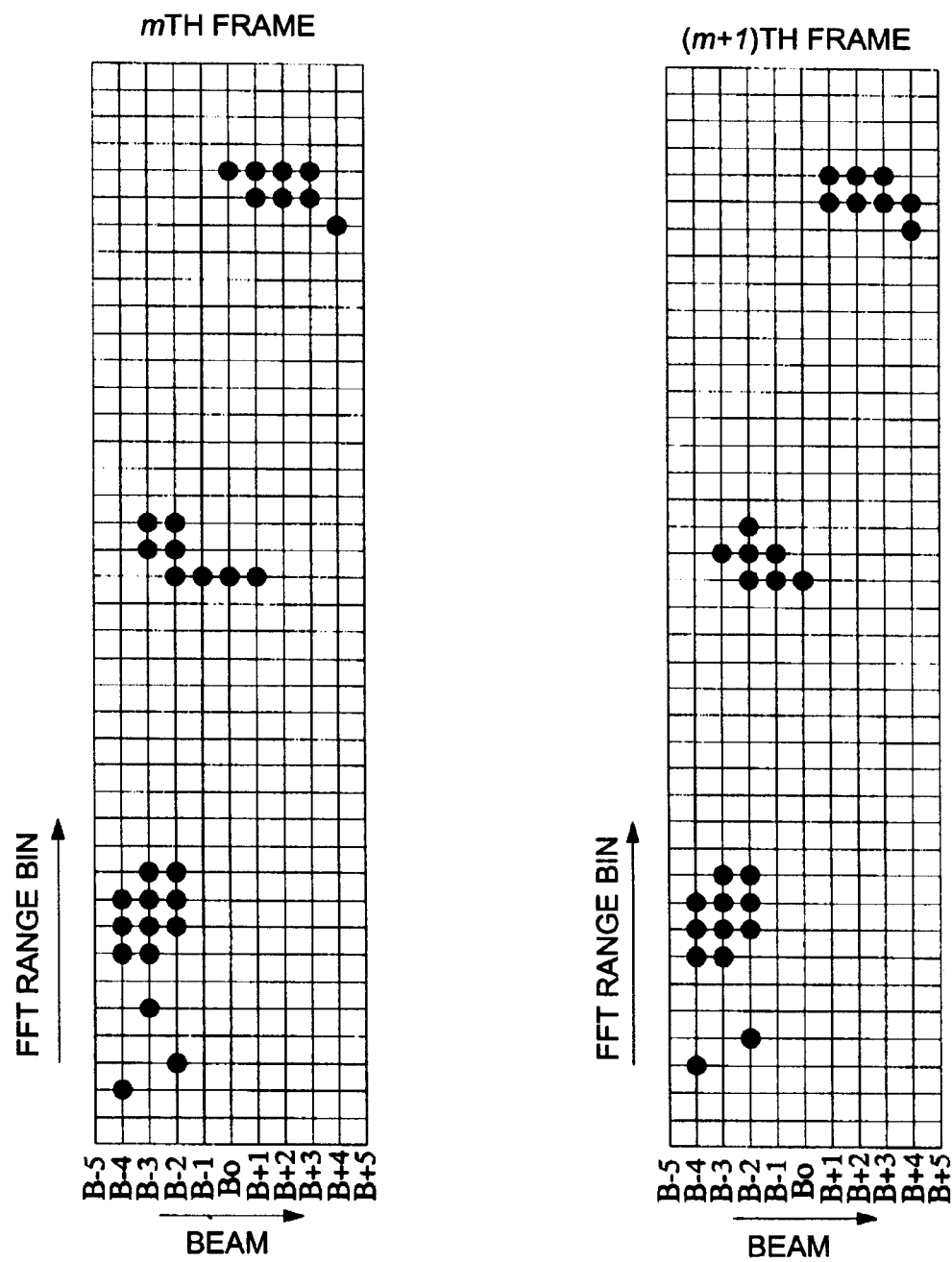
FIG. 10 is a diagram showing examples of spectra at respective beam bearing angles of frames which are adjacent to each other in the time axis.

FIG. 10 shows examples of spectra at respective beam bearing angles of two frames which are adjacent to each other in the time axis. In the operation of scanning the beam within a predetermined range of beam bearing as shown in FIG. 4, one frame of data is obtained each time the scanning is performed over the full range of beam bearing, and the difference in spectrum between the present frame of data and the previous frame of data is determined for respective beam bearings.

FIGS. 11A to 11C show an example of a process of determining the difference. More specifically, FIG. 11A shows a spectrum at an nth beam bearing angle in an mth frame, FIG. 11B shows a spectrum at the nth beam bearing angle in an (m+1)th frame, and FIG. 11C shows the difference in spectrum between the mth frame and the (m+1)th frame.

Because the period of time in which one frame is scanned is short, the change in the relative position or the relative distance of a target falls within a small range. Therefore, spectra of adjacent frames at the same bearing angle have a high correlation and thus the difference between the spectra of adjacent beam bearings becomes equal to zero or nearly equal to zero. Thus, if the resultant difference data is compressed via entropy coding such as Huffman coding, a high compression ratio is achieved.

Figure 12A:
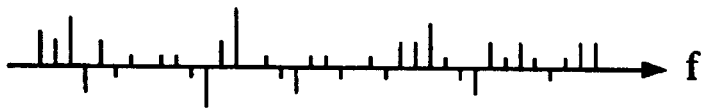
FIGS. 12A to 12C are diagrams showing an example of a process of removing a random noise component.
Figure 12B:
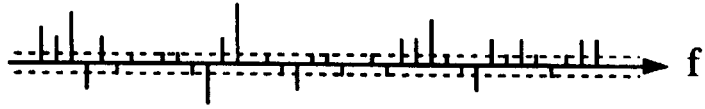
Figure 12C:
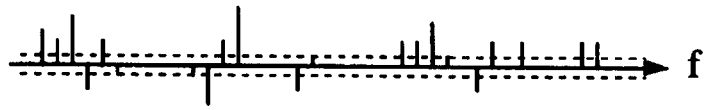

FIGS. 12A to 12C show an example of further compressing data in the middle of the process, on the basis of the difference values described above. More specifically, FIG. 12A shows the difference in spectrum between mth and (m+1)th frames at an nth beam bearing angle. In FIG. 12B, broken lines indicate a threshold value (second threshold value) applied to the difference. When the absolute value of the difference is smaller than the threshold value, if the difference is replaced with zero and if the result is then compressed via entropy coding such as the Huffman coding, the compression ratio is further improved.

When the original data, from which the difference is determined, has a value (power) greater than a threshold value (first threshold value), the replacement with zero is not performed. This makes it possible to remove only noise so that the data includes only useful information.

The data compression process performed by the radar device and the data decompression process performed by the host device are described below with reference to flow charts.

Figure 13:
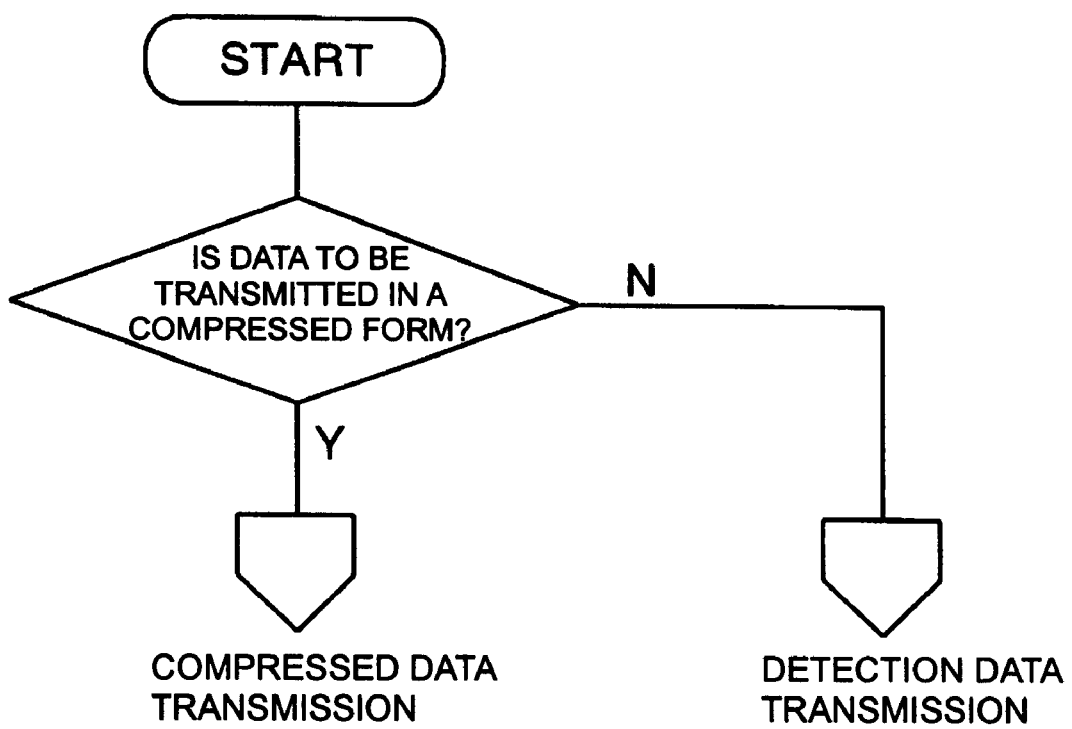
FIG. 13 is a flow chart showing a process performed by a radar device.
Figure 14:
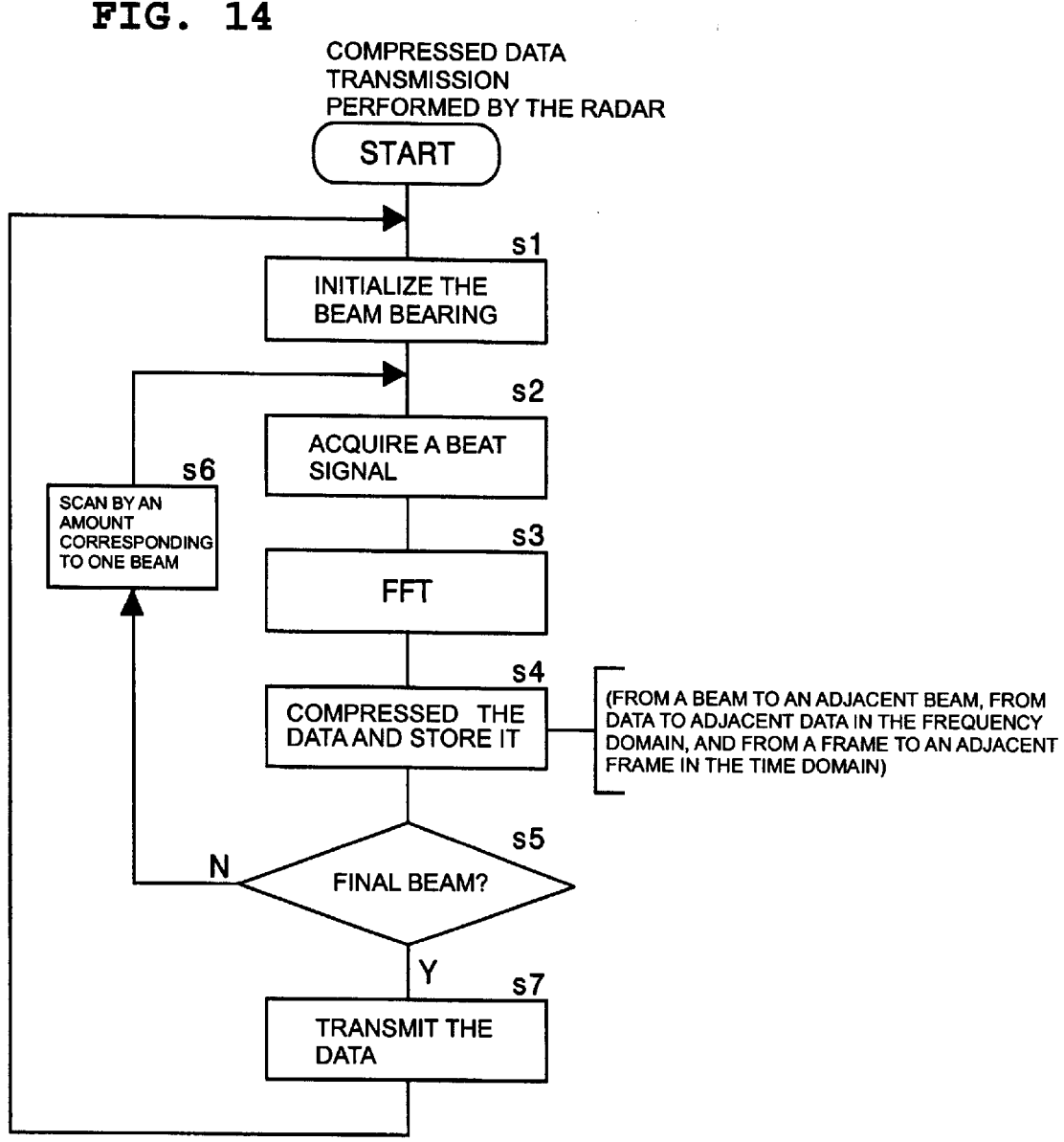
FIG. 14 is a flow chart showing a process performed by the radar device to transmit data in a compressed form.
Figure 15:
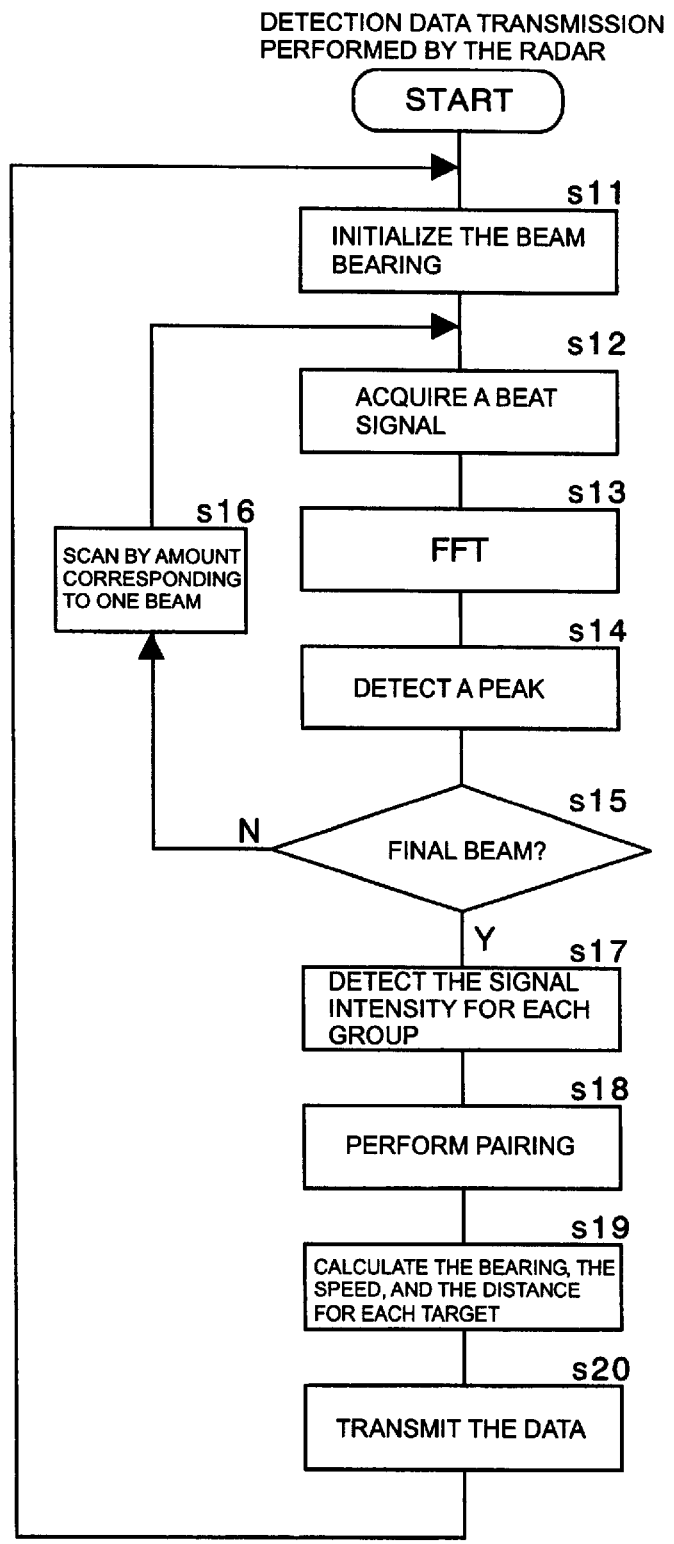
FIG. 15 is a flow chart showing a process performed by the radar device to transmit detection data.

FIGS. 13 to 15 are flow charts showing the process performed by the radar device. First, as shown in FIG. 13, it is determined whether compressed data is transmitted or detection data is directly transmitted, depending on the data processing capability of the host device and/or the data transmission rate at which data can be transmitted via a bus line.

FIG. 14 is a flow chart showing the process of transmitting data in a compressed form. First, the beam bearing is initialized (s1). For example, the initialization of the beam bearing is performed by driving the motor of the scan unit so that the beam bearing comes to one end of the scanning range. Thereafter, a beat signal is acquired, and an FFT process is performed on the acquired beat signal (s2 and s3). The resultant data is then compressed via one of the compression schemes described above or a combination of various compression schemes, and the compressed data is temporarily stored (s4). The steps s2 to s4 described above are performed repeatedly while gradually changing the beam bearing (steps s5→s6→s2). If the end of the scanning range has been reached, that is, if one frame of compressed data has been determined, the obtained data is transmitted to the host device via the bus line (s7). Thereafter, the beam bearing is again initialized, and the above process is repeated (s7→s1→ . . . ).

FIG. 15 is a flow chart showing a process performed by the radar device for a case in which detection of a target is also performed by the radar device. Fist, the beam bearing is initialized, a beat signal is acquired, and an FFT process is performed (s11, s12, and s13). Thereafter, peaks in the power spectrum determined via the FFT process are detected, and the power at each detected peak frequency is determined (s14).

The steps s12 to s14 described above are performed repeatedly while gradually changing the beam bearing (steps s15→s16→s12).

If the scanning of the beam is completed for one frame, peaks originating from the same target, appearing at respective beam bearing angles, are grouped together, and representative signal strength for each group is determined (s17). Thereafter, groups in the up-modulating interval and down-modulating interval, which can be regarded as originating from the same target, are paired (s18). The bearing, the relative speed, and the relative distance of the target are determined from the representative bearing and the representative beat frequency of the paired groups (s19). Data indicating the bearing, the relative speed, and the relative distance for each target in one frame is then transmitted to the host device via the bus line (s20).

The process described above is performed repeatedly on a frame-by-frame basis (s20→s11→ . . . ).

Figure 16:
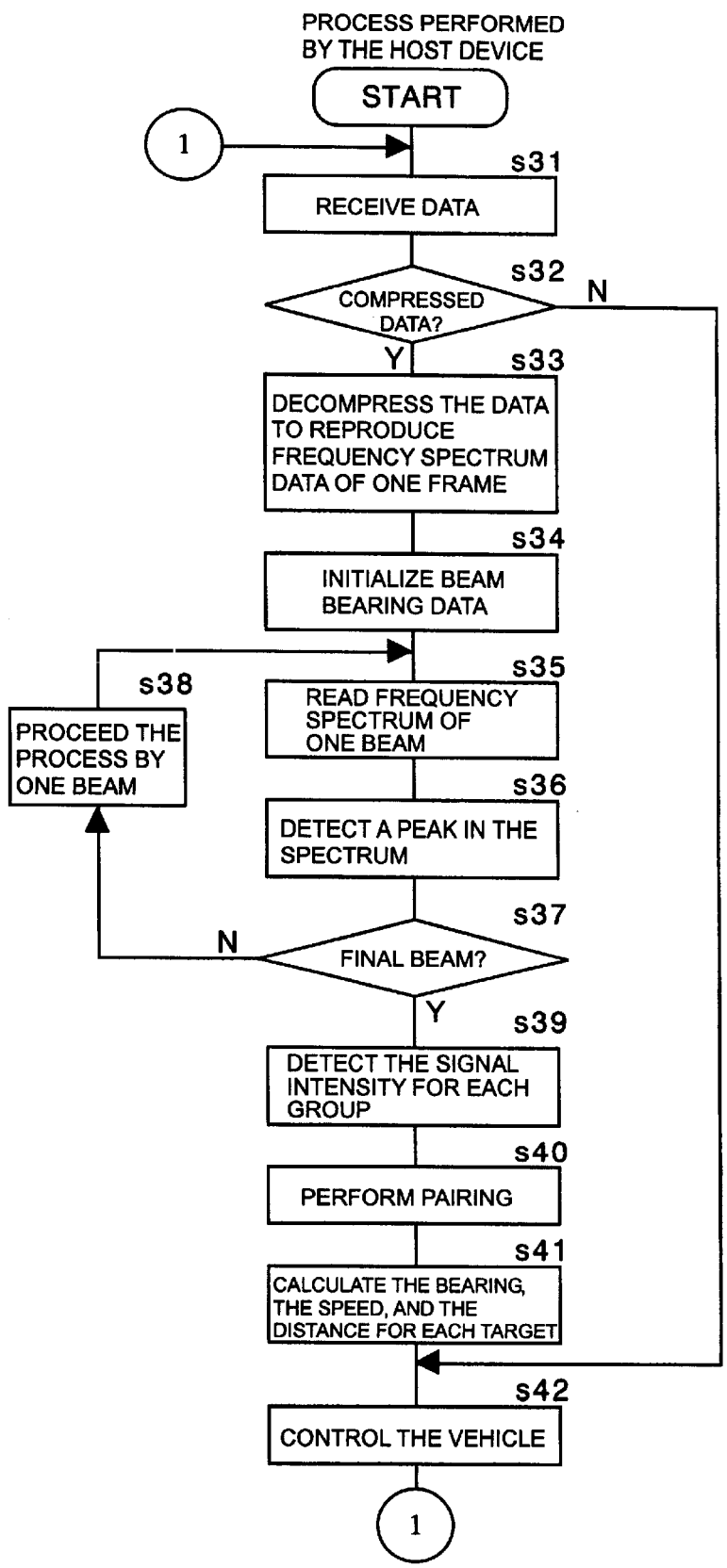
FIG. 16 is a flow chart showing a process performed by a host device.

FIG. 16 is a flow chart showing the process performed by the host device.

First, compressed data or detection data is received from the radar device via the bus line (s31). In the case in which compressed data has been received, the data is decompressed according to an algorithm which is an inverse to the algorithm used in the compression of the data, thereby reproducing spectrum data at each beam bearing angle in one frame (s33). Thereafter, the data at a beam bearing angle to be processed is initialized, the spectrum data at that beam bearing angle is read, and peaks in the spectrum are detected (s34, s35, and s36). The steps s35 and s36 are performed repeatedly for one bearing angle to another (s37→s38→s35→ . . . ).

Grouping is then performed in a similar manner as described above, the signal strength is determined for each group and pairing is performed (s39 and s40). Furthermore, the bearing, the relative speed, and the relative distance of each target are determined, and the vehicle is controlled in accordance therewith (s41 and s42).

The above-described process is performed repeatedly each time data is received from the radar device.

In the case in which the data received from the radar device is detection data indicating the bearing, the relative speed, and the relative distance of each target determined by the radar device, the host device controls the vehicle in accordance with the received detection data (s32 and s42).

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A radar system comprising:
    a radar device including:
        a first transmitter transmitting a frequency-modulated transmission signal and generating a beat signal between a portion of the transmission signal and a signal reflected from a target;
        a determining unit determining a spectrum associated with the signal strength of the beat signal;
        a data compression unit compressing spectrum data by removing redundancy from the spectrum data; and
        a second transmitter transmitting the compressed data via a transmission line; and
    a host device receiving the compressed data via the transmission line, decompressing the compressed data, and processing the decompressed data to detect the target.

2. A radar system according to claim 1, wherein the radar device further comprises a scanner scanning a beam of the transmission signal within a predetermined range of bearing angle, and the data compression unit determines a difference in spectrum of the beat signal between adjacent bearing angles.

3. A radar system according to claim 1, wherein the data compression unit determines a difference in signal strength between spectral components at adjacent locations on the frequency axis.

4. A radar system according to claim 1, wherein the radar device further comprises a scanner scanning the beam of the transmission signal within the predetermined range of bearing angle repeatedly from one frame to another, and the data compression unit determines a difference in spectrum of the beat signal between different frames at the same beam bearing angle.

5. A radar system according to claim 1, wherein the data compression unit removes random noise from the spectrum.

6. A radar system according to claim 5, wherein the compression unit replaces data whose original signal strength is lower than a first threshold value and whose difference value is lower than a second threshold value with a specific value.

7. A radar system according to claim 1, wherein the radar device further comprises a determining unit determining detection data associated with a target on the basis of the spectrum, and a third transmitter transmitting either the detection data or the compressed data to the host device via the transmission line.

8. A radar system according to claim 1, wherein the data compression unit compressing data indicating differences between spectra of adjacent beam bearings via entropy coding.

9. A radar system according to claim 6, wherein the specific value is 0.

10. A radar system according to claim 1, wherein the data compression unit includes a digital signal processor.

11. A method of using radar to detect a target comprising the steps of:
   transmitting a frequency-modulated transmission signal and generating a beat signal between a portion of the transmission signal and a signal reflected from a target;
   determining a spectrum associated with the signal strength of the beat signal;
   compressing spectrum data by removing redundancy from the spectrum data; and
   transmitting the compressed data to a host device;
   receiving at a host device the compressed data;
   decompressing the compressed data at the host device; and
   processing the decompressed data to detect the target.

12. The method according to claim 11, further comprising the steps of scanning a beam of the transmission signal within a predetermined range of bearing angle, and determining a difference in spectrum of the beat signal between adjacent bearing angles.

13. The method according to claim 11, further comprising the step of determining a difference in signal strength between spectral components at adjacent locations on the frequency axis.

14. The method according to claim 11, further comprising the step of scanning the beam of the transmission signal within the predetermined range of bearing angle repeatedly from one frame to another, and determining a difference in spectrum of the beat signal between different frames at the same beam bearing angle.

15. The method according to claim 11, further comprising the step of removing random noise from the spectrum.

16. The method according to claim 15, further comprising the step of replacing data whose original signal strength is lower than a first threshold value and whose difference value is lower than a second threshold value with a specific value.

17. The method according to claim 11, further comprising the steps of determining unit determining detection data associated with a target on the basis of the spectrum, and transmitting either the detection data or the compressed data to the host device via the transmission line.

18. The method according to claim 11, further comprising the step of compressing data indicating differences between spectra of adjacent beam bearings via entropy coding.

19. The method according to claim 16, wherein the specific value is 0.

* * * * *